United States Patent [19]

Baubles

[11] Patent Number: 5,037,333
[45] Date of Patent: Aug. 6, 1991

[54] WIRE-WRAP CONNECTOR

[75] Inventor: Richard C. Baubles, Maplewood, N.J.

[73] Assignee: Jacobson Mfg. Co., Inc., Kenilworth, N.J.

[21] Appl. No.: 608,025

[22] Filed: Nov. 2, 1990

Related U.S. Application Data

[60] Continuation of Ser. No. 399,776, Aug. 28, 1989, abandoned, which is a division of Ser. No. 159,930, Feb. 24, 1988, Pat. No. 4,880,400.

[51] Int. Cl.⁵ .............................................. H01R 4/34
[52] U.S. Cl. .................................... 439/722; 439/801; 439/888
[58] Field of Search ............... 439/709, 722, 736, 801, 439/808, 809, 813, 888

[56] References Cited

U.S. PATENT DOCUMENTS

| | | |
|---|---|---|
| 1,536,024 | 4/1925 | Kvaal . |
| 3,288,915 | 11/1966 | Hatfield et al. . |
| 3,365,539 | 1/1968 | Bratsch . |
| 3,649,957 | 3/1972 | Baluck . |
| 3,670,294 | 6/1972 | Johnson et al. . |
| 3,671,813 | 6/1972 | Wilcox . |
| 3,702,983 | 11/1972 | Chace et al. . |
| 3,748,634 | 6/1973 | Barnes et al. . |
| 3,780,211 | 12/1973 | Vernet . |
| 3,832,498 | 8/1974 | Lawson . |
| 3,960,427 | 6/1976 | Piaget et al. ........................ 439/801 |
| 4,114,365 | 9/1978 | Matsuura et al. . |
| 4,262,981 | 4/1981 | Goodman . |
| 4,274,702 | 6/1981 | Buck et al. . |
| 4,537,463 | 8/1985 | Coiner et al. . |
| 4,901,189 | 2/1990 | Merriman et al. .................. 439/722 |

FOREIGN PATENT DOCUMENTS

| | | |
|---|---|---|
| 919054 | 9/1954 | Fed. Rep. of Germany . |
| 1048975 | 1/1959 | Fed. Rep. of Germany . |
| 1094333 | 12/1960 | Fed. Rep. of Germany . |
| 141885 | 5/1980 | Fed. Rep. of Germany . |
| 595648 | 10/1925 | France ................................ 439/736 |

Primary Examiner—Gary F. Paumen
Attorney, Agent, or Firm—Richard L. Cannaday; Frank J. DeRosa

[57] ABSTRACT

An electrical connector is disclosed for receiving a wire wrapped thereto in wire-wrap fashion and a service wire removably connected thereto. In one application, a number of the connectors are mounted to a terminal block and are used to connect wires of a telephone cable, which are wire-wrapped to the connectors, to respective service wires, which are connected to respective connectors by a fastener arrangement. A connector according to the invention includes a first, electrically-conducting piece having an elongated post configured to receive a wire wrapped thereto in wire-wrap fashion and a second piece not directly fixed to the first piece including structure for connecting the service wire to the connector such that the service wire is electrically connected to the first piece, whereby an electrical path is established from the wrapped wire to the service wire through the first, electrically-conducting piece. For connecting the service wire, the second piece in a first embodiment comprises a female threaded member including a threaded bore, and the fastener comprises a screw engageable in that bore. In a second embodiment, the second piece includes a male threaded stud and the fastener comprises a nut engageable on that stud.

9 Claims, 3 Drawing Sheets

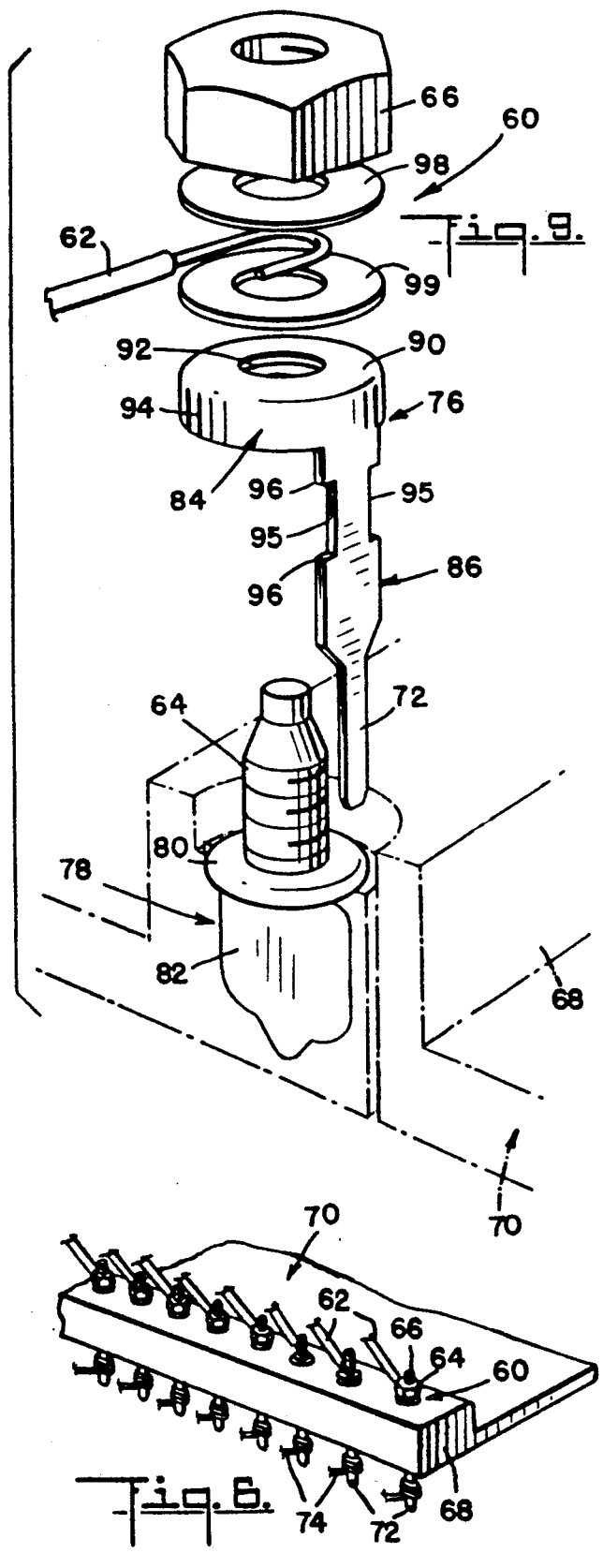
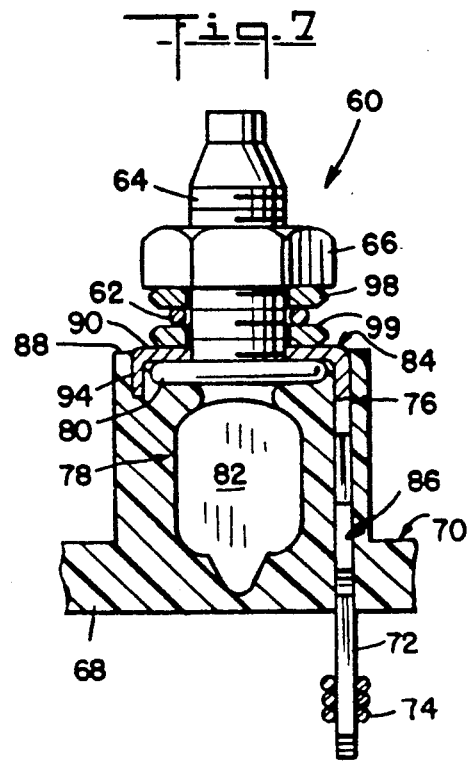
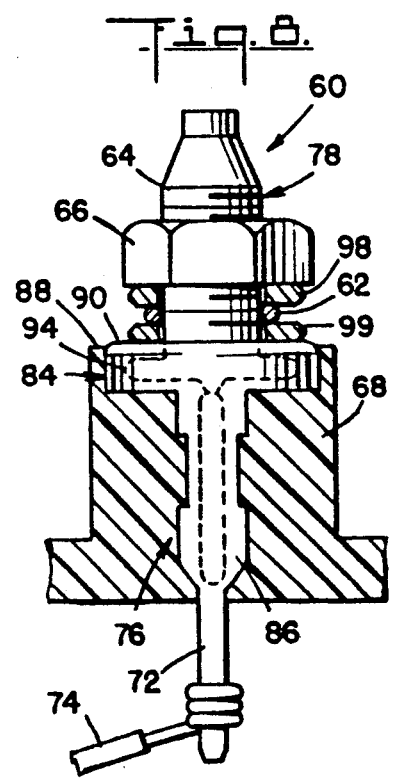

WIRE-WRAP CONNECTOR

This application is a continuation of application Ser. No. 399,776, filed Aug. 28, 1989, now abandoned, which is a division of Ser. No. 159,930, filed Feb. 24, 1988, now U.S. Pat. No. 4,880,400.

BACKGROUND OF THE INVENTION

The present invention relates to electrical connectors in general, and in particular to electrical connectors having a wire-wrap terminal for connecting a wire thereto by means of a wire-wrap connection and a terminal for removably connecting another wire thereto, particularly for use with terminal blocks, circuit boards and the like for connecting a service wire to a wire-wrap terminal point or circuit point.

A connector for connecting a wire thereto by means of a wire-wrap connection and for removably connecting another wire thereto by means of a fastener, for example, which is mounted to a terminal block, circuit board and the like must be securely mounted to the terminal block or circuit board with good torque and pullout resistances. In addition, the wires must physically be connected securely to the connector. For example, a connector which removably receives a service wire by means of a screw o nut fastener arrangement must be capable of physically withstanding repeated tightening and loosening of the fastener while providing a good physical connection of the wires to the connector and of the connector to the terminal block or circuit board. Thus, physical or mechanical requirements are imposed on such a connector as well as the electrical requirements of good electrical contact of the wires to the connector and a good electrically-conducting path through the connector between the respective wires connected thereto.

Frequently a compromise must be reached in the construction of the connector as to mechanical, electrical and cost factors. For example, the connector may be of one-piece construction made entirely of a material which is selected on the basis of its electrical characteristics. Such a connector while having good electrical characteristics may be more costly than necessary from a material standpoint and/or from a fabrication standpoint, or may not satisfy the mechanical requirements as well as desired.

In current telephone communications applications, terminal blocks typically use a wire-wrap connector for making connections to main cable wires. That connector includes a wire-wrap post to which a cable wire may be wrapped, and either a male threaded stud attached to the wire-wrap post or a female threaded member integral with the wire-wrap post for connecting a service wire to the connector. The service wire is connected to the connector with washers and either a nut or screw tightened to the male stud or female member, respectively. Typically the wire-wrap post and the male stud or female member are made of brass to provide the desired electrical characteristics described above and, in this case, the mechanical characteristics as well. Generally the plastic terminal block is molded first and the connectors inserted into the plastic block as a secondary operation, or the hardware is molded into and with the block in a single molding operation. In either case, the resulting product is quite costly, difficult to produce and inefficient in material usage.

There is thus a need for an electrical connector which provides, at low cost, a good electrical connection between a wire wrapped to the connector and another wire, while providing good mechanical connection of the wires to the connector and good mechanical connection of the connector to a terminal block or circuit board with good torque and pullout resistances.

OBJECTS AND SUMMARY OF THE INVENTION

It is an object of the present invention to provide an improved electrical connector for a terminal block, circuit board and the like for connecting at least two conductors, at least one of which is wrapped to the connector in wire-wrap fashion and at least one of which is removably connected to the connector by a movable or releasable terminal.

It is another object of the present invention to provide an electrical connector of the type described in the previous object which need not be made entirely of a material selected primarily on the basis of its electrical characteristics.

It is another object of the present invention to provide an electrical connector of the type described in the first object which is easy to manufacture and is of low cost.

The above and other objects are achieved in accordance with the present invention by making the connector in two pieces, a first piece having a wire-wrap terminal for receiving a first conductor wrapped thereto and providing an electrical path from the wire-wrap terminal to another terminal, and a second piece including the other terminal to which a second conductor may removably be connected, the two pieces cooperating to electrically connect the second conductor to the first piece. By providing the connector in two pieces, the first piece may be selected primarily on the basis of suitability for receiving a wire-wrapped conductor and establishing an electrical path from the wrapped conductor to the second piece, and the second piece may be selected primarily on the basis of the mechanical requirements discussed above.

A connector according to the invention includes a first, electrically-conducting piece having an elongated post configured to receive the first conductor wrapped thereto in wire-wrap fashion and a second piece not directly fixed to the first piece including structure for connecting the second conductor to the connector such that the second conductor is electrically connected to the first piece, whereby an electrical path is established from the first conductor to the second conductor through the first, electrically-conducting piece. In specific embodiments, the structure for connecting the second conductor to the connector detachably connects the second conductor to the connector.

In the preferred embodiments, the connecting structure referred to above includes a fastener removably engageable with the second piece. In a first embodiment, the second piece comprises a female threaded member, for example, including a threaded bore, and the fastener comprises a screw engageable in that bore. The first piece includes a contact portion and the second piece includes a face or contact portion adjacent which the threaded bore opens. The screw has a head and the contact portion of the first piece is disposed in the assembled condition of the connector adjacent the face of the second piece such that the second conductor may be engaged between the screw head and the contact portion when the screw is tightened in the bore. The contact portion of the first piece is annular and is disposed concentrically with the threaded bore adjacent the face of the second piece. The contact portion of the first piece is dish-shaped and has a larger outer diameter than the peripheral extent of the face of the second piece so as to at least partially receive the face therein. The first piece includes an angled portion extending parallel to the contact portion and spaced therefrom, the angled portion being connected to the contact portion by a side or connecting portion, and the second piece is configured to be received between the angled and contact portions. The first piece is flexible so that the angled portion and the contact portion may be flexed away from each other a distance sufficient to permit the second piece to be inserted therebetween. Upon release of the flexing of the first piece, a second piece inserted between the angled and contact portions of the first piece is retained therebetween by spring action.

In a second embodiment, the second piece includes a male threaded stud and the fastener comprises a nut engageable on that stud. The first piece includes a contact portion disposed in the assembled condition of the connector adjacent the threaded stud such that the second conductor may be engaged between the nut and the contact portion when the nut is tightened to the threaded stud. The second piece has a base portion configured to be anchored in a mounting structure and a shoulder portion disposed concentrically with the threaded stud of the second piece, the contact portion of the first piece being annular and being disposed concentrically with the threaded stud adjacent the shoulder portion of the second piece. The contact portion of the first piece is dish-shaped and has a larger outer diameter than the peripheral extent of the shoulder portion of the second piece, the shoulder portion of the second piece being at least partially received in the dish-shaped contact portion of the first piece.

The above and other objects, advantages, features and aspects of the present invention will be more readily perceived from the following description of the preferred embodiments thereof taken with the accompanying drawings and appended claims.

BRIEF DESCRIPTION OF THE DRAWINGS

The present invention is illustrated by way of example and not limitation in the Figures of the accompanying drawings, in which like references indicate like parts and in which:

FIG. 6 is a perspective view of a terminal block to which a number of electrical connectors according to the second embodiment of the invention are mounted, with the terminal block being attached to a circuit board;

FIG. 7 is a sectional view taken transversely through the terminal block of FIG. 6, a portion of the circuit board and through the wire-wrap post of one of the connectors;

FIG. 8 is a sectional view taken through the terminal block of FIG. 6 at an angle of 90° to the section in FIG. 7; and FIG. 9 is an exploded perspective view of a connector and the portion of the terminal block of FIG. 6 to which it is mounted which is shown in phantom.

DESCRIPTION OF THE PREFERRED EMBODIMENTS

Figure 2:
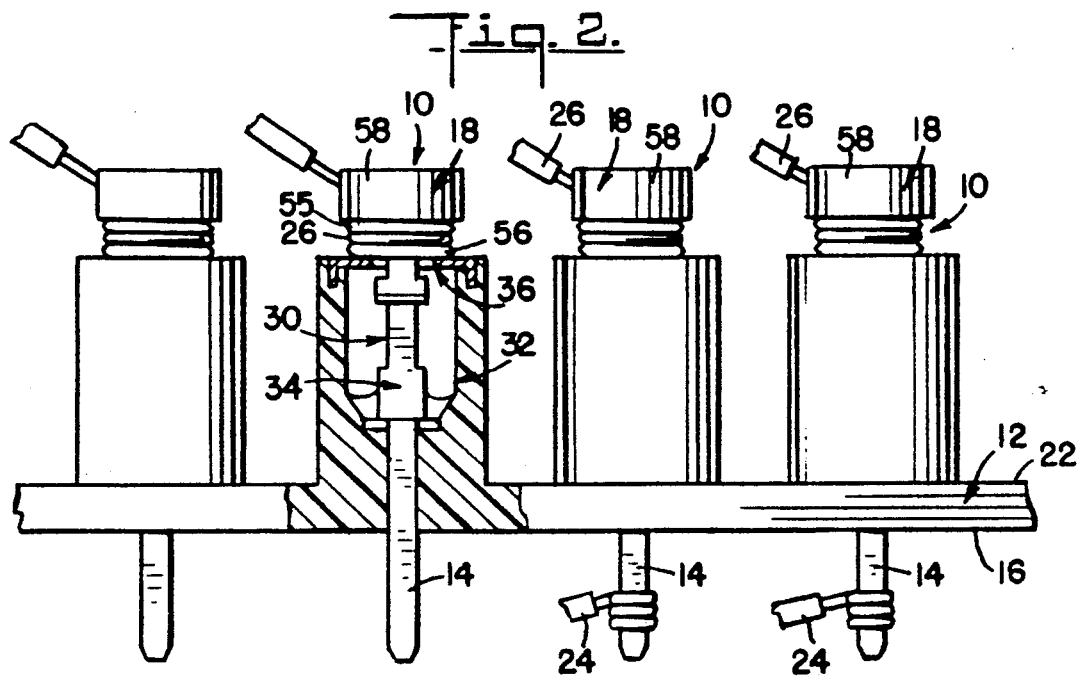
FIG. 2 is a side elevation view of the terminal block and connectors of FIG. 1, with one of the connectors and the portion of the terminal block surrounding that one connector being shown in section.

Referring now to the drawings, FIGS. 1-5 illustrate an electrical connector 10 according to the first embodiment of the invention and FIGS. 6-9 illustrate an electrical connector 60 according to the second embodiment of the invention.

Figure 1:
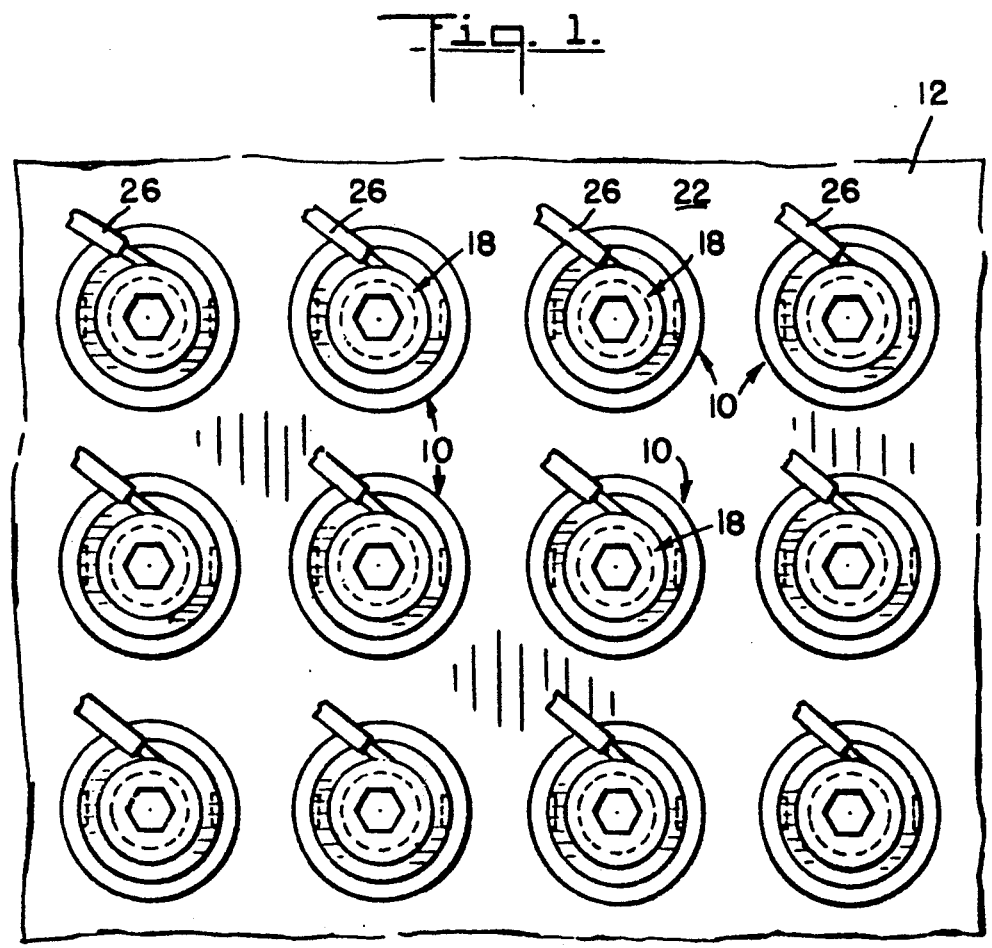
FIG. 1 is a top plan view of a portion of a terminal block to which a number of electrical connectors according to the first embodiment of the invention are mounted.

With reference specifically to FIGS. 1 and 2, a number of connectors 10 are mounted to terminal block 12. A typical connector 10 includes a wire-wrap post 14 projecting from one side 16 of terminal block 12 and a fastener in the form of a screw 18 tightened thereto projecting from the other side 22 of terminal block 12. Post 14 is of rectangular cross section suitable for receiving a first conductor in the form of a wire 24 wrapped conventionally thereabout to form a conventional wire-wrap connection of wire 24 to post 14. A second conductor in the form of a service wire 26 is wound at least partially around screw 18 which is threaded to connector 10 to removably electrically connect wire 26 thereto, and thereby electrically connect wire-wrapped wire 24 and service wire 26.

Figure 3:
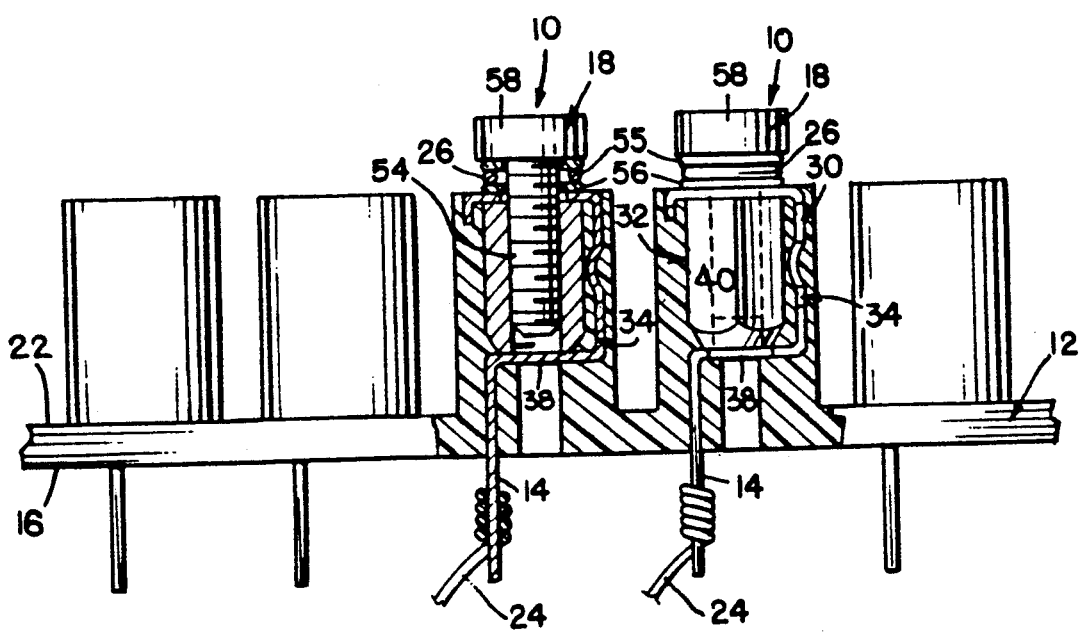
FIG. 3 is a sectional view taken through a portion of the terminal block of FIG. 1 at an angle of 90° to the section in FIG. 2, the section being taken through the center of one connector and adjacent the side of the adjacent connector.
Figure 4:
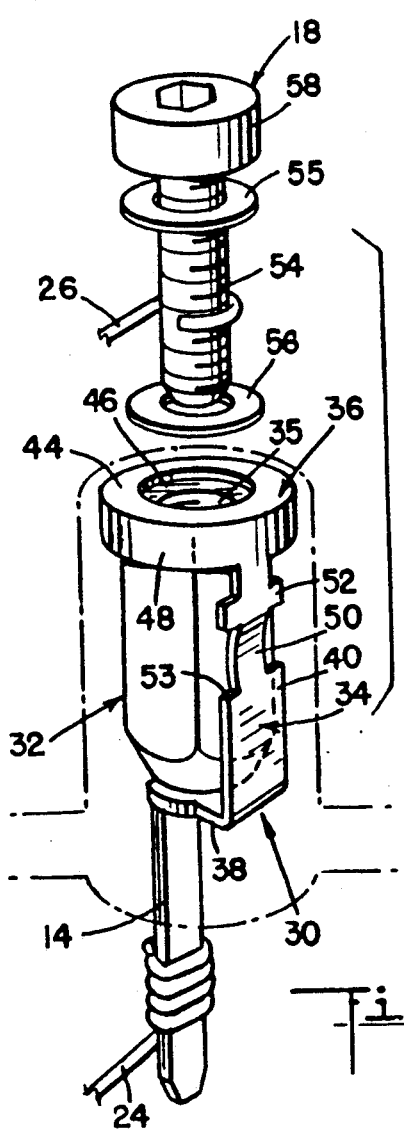
FIG. 4 is a partially exploded perspective view of one of the connectors of FIG. 1 showing separation of a screw, washers and a wire extended about the screw from the remainder of the connector.
Figure 5:
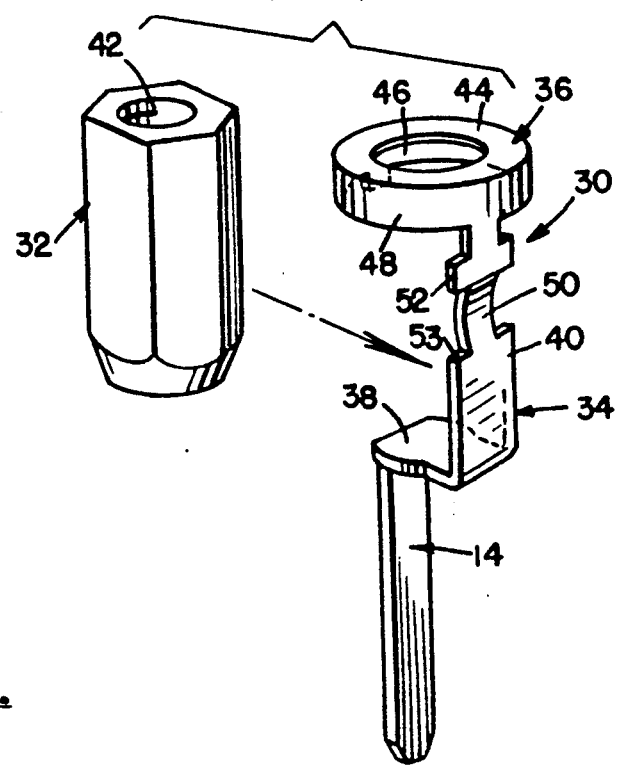
FIG. 5 is an exploded perspective view of the connector depicted in FIG. 4, with the screw, washers and wire not shown, depicting separation of a first electrically-conducting piece from a second female threaded piece which receives the screw.

Referring next to FIGS. 2-5, connector 10 includes a first electrically-conducting part 30 and a second female threaded part 32 which is not directly fixed to first part 30. First part 30 may be a stamped brass or steel clip and second part 32 may also be made of brass or steel, but need not be. First part 30 includes wire-wrap post 14, central portion 34 and contact portion 36. As depicted in FIGS. 2 and 3, central portion 34 is imbedded in terminal block 12 with post 14 projecting from side 16 thereof and contact portion 36 disposed adjacent the outer surface of side 22 and exposed with respect thereto. As depicted in FIGS. 3-5, first part 30 includes in the central portion 34 thereof angled portion 38 spaced from and connected to contact portion 36 by connecting portion 40. Angled portion 38 extends generally parallel to contact portion 36 so as to receive second part 32 therebetween.

As depicted in FIGS. 4 and 5, second part 32 includes a threaded bore 42 for receiving screw 18 therein, and contact portion 36 is generally annular including a face portion 44 having a central hole 46 registered with bore 42 and also a circumferential lip or flange portion 48 surrounding face portion 44. Contact portion 36 thus resembles an inverted dish with a central hole. Second part 32 and the central portion 34 of first part 30 are sized so that second part 32 is partially received within the dish-shape of contact portion 36. To facilitate fabrication of first part 30 and second part 32 in terminal block 12 during molding thereof, those parts are preferably pre-assembled into a unit. To that end, connecting portion 40 flexibly connects angled portion 38 and contact portion 36 so that those portions may be flexed away from each other and second part 32 inserted therebetween. Specifically, connecting portion 40 includes a pre-stressed curved portion 50 along which connecting portion 40 elastically bends when portions 36 and 38 are forced away from each other. Upon release of the flexing of first part 30, second part 32 becomes engaged by and between angled portion 38 and contact portion 36, with the upper part of second part 32 received in the dish-shaped contact portion 36 and with bore 42 and hole 46 registered.

Connecting portion 40 provides a spring action to engagement of second part 32 between portions 36 and 38. That spring action cooperates with the surrounding of the upper part of second part 32 by flange portion 48 to provide a mechanically-engaged subassembly of first part 30 and second part 32 which will withstand molding forces and stay together during molding.

First part 30 is configured so as to improve its retention in terminal block 12 and prevent any relative movement between first part 30 and terminal block 12, i.e., so as to improve the torque and pullout resistances of connector 10. To that end, first part 30 is provided with sharp projections or tabs 52 and 53 (FIGS. 3 and 4) which interlock with plastic material molded thereabout.

Service wire 26 is connected to connector 10 by at least partially winding it around the shaft 54 of screw 18 sandwiched between washers 55 and 56. Upon tightening screw 18 to second part 32, service wire 26 is sandwiched tightly between washers 55 and 56, and brought tightly into electrical contact with face portion 44 of contact portion 36 through washer 56. Electrical connection of wire-wrapped wire 24 and service wire 26 is made through first part 30.

The material of which first part 30 is made may be selected primarily for its electrical characteristics so as to establish a good electrical path between wires 24 and 26, and its configuration selected so as to make good contact with washer 56 and also to improve its retention as imbedded within terminal block 12. Second part 32 need not have good electrical characteristics, and need not even be made of electrically-conductive material. Second part 32 may be made of an inexpensive material such as iron, steel, aluminum or even a plastic material. The material of which second part 32 is made is selected so that bore 42 thereof may be threaded and so that second part 32 may tightly receive screw 18 therein with screw head 58 in good contact with contact portion 36 (through washers 55 and 56 and service wire 26) even after screw 18 has been repeatedly tightened and loosened.

Electrical connector 60 depicted in FIGS. 6-9 differs from connector 10 in that connector 60 primarily fastens service wire 62 thereto by means of a threaded stud 64 and nut 66 rather than by means of screw 18 and threaded bore 42.

Referring to FIG. 6, a number of connectors 60 are secured to a thickened or terminal block portion 68 of a circuit board 70. Each connector 60 includes a wire-wrap post 72 for receiving a first conductor in the form of wire-wrapped wire 74 as described above in connection with connector 10, and threaded stud 64 and nut 66 for attaching a second conductor in the form of service wire 62 to connector 60 in a manner generally similar to that described for service wire 26 of connector 10.

As depicted in FIGS. 7-9, connector 60 includes a first part 76 and a second part 78. Second part 78 includes threaded stud 64, disc-like central (shoulder) portion 80 and spade-like anchor (base) portion 82. First part 76 includes contact portion 84, central connecting portion 86 and post 72 for receiving wire 74 in wire-wrap fashion.

First part 76 and second part 78 are both embedded in terminal block portion 68. Spade-like anchor portion 82 is shaped to resist rotation of second part 78 during tightening and loosening of nut 66. Second part 78 is positioned in circuit board 70 with disc-like central portion 80 adjacent and below the outer surface 88 of circuit board 70. Contact portion 84 of first part 76 includes a face portion 90 having a central hole 92, and also a circumferential lip or flange 94. Contact portion 84 thus generally resembles an inverted dish, as described above in connection with contact portion 36 of connector 10. First part 76 is positioned so that threaded stud 64 projects through central hole 92 and outwardly from outer surface 88 of circuit board 70 and with the disc-like central portion 80 of second part 78 received in the dish-shaped contact portion 84 of first part 76. Central connecting portion 86 of first part 76 includes opposed cutouts 95 which form sharp corners 96 that assist in securing first part 76 in circuit board 70, as described above in connection with connector 10.

Shaping contact portion 84 in dish fashion so as to receive disc-like central portion 86 provides a support for contact portion 84 against which nut 66 may be tightened. Service wire 62 is attached to connector 60 by partially winding it around threaded stud 64 sandwiched between washers 98 and 99, and tightening nut 66 against contact portion 84, thereby electrically connecting wire 62 to contact portion 84 through washer 99.

As is the case with connector 10, the material of first part 76 may be selected primarily on the basis of its electrical characteristics, and that of second part 78 primarily on the bases of imbedding that part in circuit board 70, supporting first part 76 during tightening of nut 66 thereagainst and being torque and pullout resistant.

Connector 60 has several advantages over a prior art connector which includes a tail, part of which is imbedded in a terminal block and the end of which is flattened and extends from the terminal block suitably configured to receive a wire-wrap connection. Wire-wrap post 72 of inventive connector 60 need not extend along the center line of the connector in contrast to the prior art connector described immediately above. This allows more design flexibility. For example, where connections are required in an adjacent area, central connecting portion 86 of inventive connector 60 can be extended to make those connections. Connector 60 is much easier to produce in comparison to the prior art connector discussed above in that at least one operation can be omitted and the most difficult tolerances (those on the wire wrap post) are no longer required. When the prior art connector described immediately above is injection molded, the diameter of the flange portion adjacent the nut must be significantly larger than the dimension across corners of the nut to provide a seal-off surface for the molds. That larger flange diameter adds substantially to the forming difficulty (the most economical approach is to pre-assemble the nut and washers before the assembly is molded). Face portion 90 of contact portion 84 of connector 60 may be made smaller than the flange of the prior art connector referred to above since washer 99 provides the seal-off surface for the molds. As a result and because a larger diameter washer is no more difficult to manufacture than a smaller diameter washer, connector 60 is easier and more economical to manufacture than the prior art connector described above.

Protection by Letters Patent of this invention in all its aspects as the same are set forth in the appended claims is sought to the greatest extent that the prior art allows.

I claim as my invention:

1. A connector adapted to being embedded in a molded electrically-insulating material for receiving a first conductor in a wrapped relationship thereto and a second conductor and electrically connecting the conductors, comprising:
   a first, electrically-conducting piece having a post configured to receive the first conductor wrapped thereto, a contact portion having a contact face extending transversely to a longitudinal axis of the post, a peripheral flange portion at the periphery of the contact face extending transversely to the contact face and a hole in that face, the first piece also including a connecting portion connecting the post and the contact portion extending generally parallel to the post longitudinal axis, the connecting portion being adapted to be embedded within the molded material when that material is molded with the connecting portion of the first piece therein, and
   a second piece not unitary with the first piece and disposed in the assembled condition of the connector adjacent the connecting portion of the first piece, the second piece including a threaded stud and a shoulder portion extending transversely to the axis of the stud, the shoulder portion being received in the peripheral flange portion adjacent the contact face in the assembled condition of the connector and the shoulder portion being adapted to be embedded in the molded material, the connector including a nut engageable with the threaded stud, the contact face of the first piece being disposed in the assembled condition of the connector adjacent the shoulder portion of the second piece with the threaded stud projecting through the hole such that the nut may be tightened to the stud to draw the nut to the contact face to engage a second conductor disposed between the nut and the contact face, whereby an electrical path may be established from the first conductor to the second conductor through the first, electrically-conducting piece.

2. The connector according to claim 1 wherein the second piece has a base portion configured to be anchored in the molded material and the shoulder portion is annular and is disposed concentrically with the threaded stud of the second piece, the contact face of the first piece being annular and being disposed concentrically with the threaded stud adjacent the shoulder portion of the second piece with the shoulder portion received within the flange portion.

3. The connector according to claim 2 wherein the flange portion extends circumferentially about the entire contact face of the first piece and receives therein the shoulder portion of the second piece.

4. A connector embedded in a molded electrically-insulating material for receiving a first conductor in a wrapped relationship thereto and a second conductor and electrically connecting the conductors, comprising:
   a first, electrically-conducting piece having a post configured to receive the first conductor wrapped thereto, a contact portion having a contact face extending transversely to a longitudinal axis of the post, a peripheral flange portion at the periphery of the contact face extending transversely to the contact face and a hole in that face, the first piece also including a connecting portion connecting the post and the contact portion extending generally parallel to the post longitudinal axis, the connecting portion being embedded in the molded material, and
   a second piece not unitary with the first piece disposed adjacent the connecting portion of the first piece, the second piece including a threaded stud and a shoulder portion extending transversely to the axis of the stud, the shoulder portion being received in the peripheral flange portion adjacent the contact face in the assembled condition of the connector and the shoulder being embedded in the molded material, the connector including a nut engageable with the threaded stud, the contact face of the first piece being disposed adjacent the shoulder portion of the second piece with the threaded stud projecting through the hole such that the nut may be tightened to the stud to draw the nut to the contact face to engage a second conductor disposed between the nut and the contact face, whereby an electrical path may be established from the first conductor to the second conductor through the first, electrically-conducting piece.

5. The connector according to claim 4 wherein the second piece has a base portion configured to be anchored in the molded material and the shoulder portion is annular and is disposed concentrically with the threaded stud of the second piece, the contact face of the first piece being annular and being disposed concentrically with the threaded stud adjacent the shoulder portion of the second piece with the shoulder portion received within the flange portion.

6. The connector according to claim 5 wherein the flange portion extends circumferentially about the entire contact face of the first piece and receives therein the shoulder portion of the second piece.

7. A connector embedded in a molded electrically-insulating material for receiving a first conductor in a wrapped relationship thereto and a second conductor and electrically connecting the conductors, comprising:
   a first, electrically-conducting piece having a post configured to receive the first conductor wrapped thereto, a contact portion having a contact face extending transversely to a longitudinal axis of the post disposed substantially flush with an outer surface of the molded material and a hole in that face, the first piece including a connecting portion connecting the post and the contact portion extending generally parallel to the post longitudinal axis, the connecting portion being embedded in the molded material, and
   a second piece not unitary with the first piece disposed adjacent the connecting portion of the first piece, the second piece including a threaded stud and a shoulder portion extending substantially parallel to the contact face of the first piece, the shoulder portion being embedded in the molded material, the contact face of the first piece being disposed adjacent the shoulder portion of the second piece with the threaded stud projecting through the hole, the connector including a nut engageable with the threaded stud which may be tightened to the stud to draw the nut to the contact face to engage a second conductor disposed between the nut and the contact face, whereby an electrical path may be established from the first conductor to the second conductor through the first, electrically-conducting piece.

8. The connector according to claim 7 wherein the second piece has a base portion configured to be anchored in the molded material.

9. The connector according to claim 8 wherein the shoulder portion is annular and disposed concentrically with the threaded stud, and the contact face of the first piece is annular and is disposed concentrically with the threaded stud adjacent the contact face of the second piece, and wherein the first piece includes a flange portion extending circumferentially about the entire contact face of the first piece, the shoulder portion of the second piece being received within the flange portion of the first piece and being embedded in the molded material.

* * * * *